Jan. 24, 1950      E. HRABAL      2,495,454
TRAP
Filed April 15, 1948
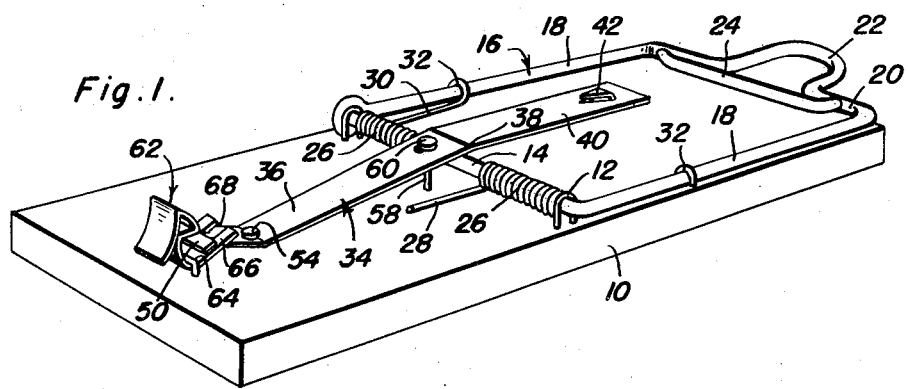
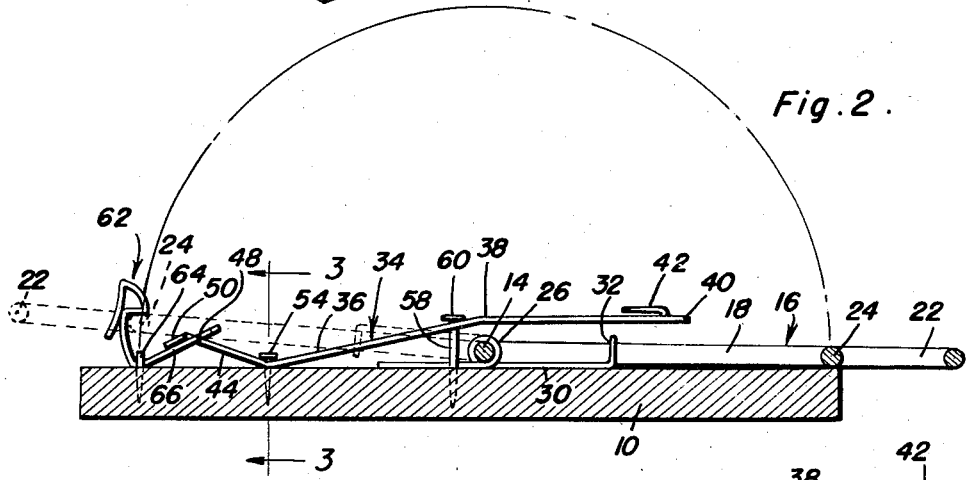
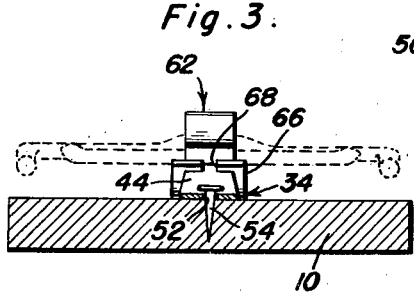
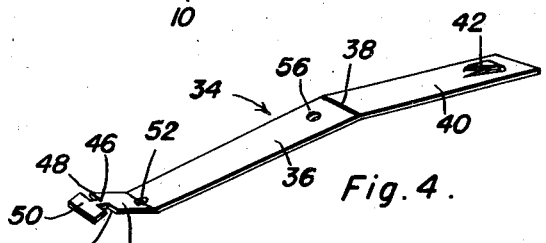
Inventor
Eduard Hrabal
By *Clarence A. O'Brien and Harvey B. Jackson*
Attorneys Patented Jan. 24, 1950

2,495,454

UNITED STATES PATENT OFFICE 2,495,454

TRAP

Eduard Hrabal, Washington, D. C., assignor of thirty-five per cent to Rafael Dominguez, Washington, D. C.

Application April 15, 1948, Serial No. 21,282

2 Claims. (Cl. 43—83.5)

1

This invention relates to a trap and more particularly to a trap of the type employed for catching and destroying rodents such as rats, mice and the like.

The primary object of the invention is to protect the fingers of the user of the trap against injury through accidentally springing the trap while setting it.

Another object is to simplify the construction of traps of this character so that they can be easily and cheaply made and yet are highly efficient in service.

The above and other objects may be attained by employing this invention which embodies among its features an elongated substantially rectangular base, a jaw pivoted at one end to the base intermediate the ends thereof, means yieldingly to move the jaw into contact with the base adjacent one end thereof, animal released means to hold the jaw against movement under the influence of the yielding means and an extension on the jaw forming a finger grip which projects beyond the end of the base toward which the jaw is moved under the influence of the yielding means.

In the drawings:

Figure 1 is a perspective view of a trap embodying the features of this invention, Figure 2 is a longitudinal sectional view through the trap illustrated in Figure 1, Figure 3 is a transverse sectional view taken substantially along the line 3—3 of Figure 2 and Figure 4 is a perspective view of the bait carrying rock arm.

Referring to the drawings in detail a base 10 comprises a substantially rectangular body of wood or similar material. Driven into the base 10 adjacent the opposite side edges thereof, and intermediate its ends are staples 12 forming the bearings in which the pivot bar 14 of a jaw designated generally 16 is received. The jaw 16 is formed of a continuous piece of relatively heavy wire which is bent to form the pivot bar 14 and a pair of spaced parallel arms 18 which are joined at their ends remote from the pivot bar by an end bar 20 which is formed intermediate its ends with an outwardly extending extension 22 which forms a finger grip for manipulating the jaw when setting the trap. A crusher bar 24 extends across the open end of the extension 22 for contact with the base 10 when the trap is sprung. Encircling the pivot bar 14 are spaced tortion springs 26 certain ends of which are extended as at 28 to bear on the base 10 while the opposite ends are extended as at 30 and equipped with hooks 32 which engage the side bars 18 of the jaw 16, so as to cause the springs 26 forcibly to advance the jaw and crusher or guillotine bar 24 thereof into contact with the base adjacent one end thereof. It is to be noted that when the trap is sprung and the jaw is held by the springs 26 into contact with the base, the extension 22 projects beyond the end of the base as will be readily understood upon reference to Figure 2.

A bait holder and rock arm designated generally 34 comprises a strip of metal 36 bent intermediate its ends at 38 to form an extension 40 which overhangs that portion of the base 10 which lies between the pivot bar 14 of the jaw 16 and the end of the base against which the jaw is forced by the springs. A bait retaining spur 42 is struck from the extension 40 adjacent the end thereof remote from the body 36. Formed at the end of the body 36 remote from the extension 40 is an upwardly inclined portion 44 which is provided at its end remote from the body 36 with an upwardly extending tongue 46 which forms at its junction with the extension 44 a pair of spaced shoulders 48. A head 50 is carried by the end of the tongue 46 remote from the angular extension 44, and formed in the rock arm 34 at the junction of the body 36 with the upwardly inclined portion 44 is an opening 52 for the reception of a tack 54. From the structure just defined it will be evident that the junction of the body 36 with the extension 44 forms a fulcrum about which the rock arm 34 may move. Formed in the body 36 adjacent its junction with the overhanging extension 40 is an opening 56 for the reception of the shank of a pin or nail 58 which as illustrated in Figure 2 is driven into the base 10 near the pivot bar 14. The pin or nail 58 is equipped with a head 60 which serves to limit upward movement of the rock arm, while the shank of the nail or pin 58 holds the rock arm in proper relation on the base 10 and prevents its swinging about the axis of the nail or tack 54.

A latch member designated generally 62 is pivotally supported on a staple 64 adjacent the end of the base 10 remote from that toward which the springs 26 urge the free end of the jaw 16 and the latch 62 is adapted to engage the guillotine or crusher bar 24 when the trap is set as will be readily understood upon reference to the dotted line position illustrated in Figure 2. Formed at the lower end of the latch and extending upwardly therefrom toward the pivot bar 14 is a latch releasing lever 66 which is formed with a slot 68 which opens through the end thereof remote from the junction of the lever with the latch and is adapted to receive the shank 46 as shown in Figure 2. With the parts assembled as illustrated in the drawings, the tongue 46 is received in the slot 68 with the head 50 overlying the upper face of the lever 66 while the shoulders 48 engage the under side of said lever. It will thus be seen that by rocking the rock arm 34 about its fulcrum point, the latch will be rocked beneath the bight portion of the staple 64.

In use when it is desired to set the trap a suitable bait is coupled to the bait hook 42 of the rock arm 34 and the jaw 16 is swung against the effort of the springs 26 to substantially the dotted line position illustrated in Figure 2 so that the crusher or guillotine bar 24 is engaged beneath the latch 62. In this position the trap is set, and when an animal approaches the bait supported on the spur 42 and exerts slight down pressure thereon, it is evident that the shoulders 48 will engage the under side of the latch releasing lever 66 to rock the latch 62 and move it out of jaw retaining position. As soon as the latch is released, the jaws will be moved under the influence of the springs 26 so as to forcibly drive the crusher or guillotine bar 24 against the animal. Obviously the finger grip formed by the extension 22 may be used to return the jaw to set position, and even though an accident may occur, the fingers of the user are kept far enough away from the base 10 of the trap so that no injury need result in using the trap.

While in the foregoing there has been shown and described the preferred embodiment of this invention it is to be understood that minor changes in the details of construction and arrangement of parts may be resorted to without departing from the spirit and scope of the invention as claimed.

Having described the invention, what is claimed as new is:

1. A trap comprising an elongated base, a jaw pivotally supported at one end between opposite ends of the base, a tortion spring at the pivoted end of the jaw for moving the opposite end of the jaw toward one end of the base, a rock arm pivoted to the base between the pivoted end of the jaw and the end of the base remote from that toward which the spring moves the jaw, one end of the rock arm overhanging that portion of the base which lies between the pivoted end of the jaw and the end of the base toward which the spring moves the jaw, said rock arm including a bait hook adjacent the overhanging end thereof and a tongue having a head adjacent the pivoted end thereof, and a latch pivotally supported on the base between the pivot point of the rock arm and the adjacent end of the base, said latch being adapted to engage the jaw and hold same against movement by the spring, said latch including a releasing lever for cooperation with the head on the tongue in rocking the latch about its pivot to move the latch into jaw engaging position.

2. The combination of claim 1 wherein said rock arm includes a shoulder at the junction of the rock arm with the tongue for engaging the lever and moving the latch out of jaw retaining position.

EDUARD HRABAL.

REFERENCES CITED

The following references are of record in the file of this patent:

UNITED STATES PATENTS

| Number | Name | Date |
| --- | --- | --- |
| 1,014,550 | Winkler | Jan. 9, 1912 |
| 1,138,943 | Duncan | May 11, 1915 |
| 1,164,916 | Brown | Dec. 21, 1915 |